US011200283B2

(12) United States Patent
Mujumdar et al.

(10) Patent No.: US 11,200,283 B2
(45) Date of Patent: Dec. 14, 2021

(54) COHESIVE VISUALIZED INSTRUCTION REPRESENTATION

(71) Applicant: International Business Machines Corporation, Armonk, NY (US)

(72) Inventors: Shashank Mujumdar, Nagpur (IN); Nitin Gupta, Saharanpur (IN); Sameep Mehta, New Delhi (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 186 days.

(21) Appl. No.: 16/154,418

(22) Filed: Oct. 8, 2018

(65) Prior Publication Data

US 2020/0110844 A1   Apr. 9, 2020

(51) Int. Cl.
| | |
|---|---|
| *G06F 16/30* | (2019.01) |
| *G06F 16/9038* | (2019.01) |
| *G06F 16/50* | (2019.01) |
| *G06F 16/338* | (2019.01) |
| *G06F 16/33* | (2019.01) |
| *G06F 16/9032* | (2019.01) |
| *G06F 40/20* | (2020.01) |

(52) U.S. Cl.
CPC ........ *G06F 16/9038* (2019.01); *G06F 16/338* (2019.01); *G06F 16/3334* (2019.01); *G06F 16/50* (2019.01); *G06F 16/90332* (2019.01); *G06F 40/20* (2020.01)

(58) Field of Classification Search
CPC ............. G06F 16/9038; G06F 16/3334; G06F 16/90332; G06F 16/338

USPC ........ 707/609, 687, 705, 769, 790, 813, 821
See application file for complete search history.

(56) References Cited

U.S. PATENT DOCUMENTS

| | | |
|---|---|---|
| 7,512,537 B2 | 3/2009 | Pahud et al. |
| 9,129,448 B2 | 9/2015 | Bekmambetov et al. |
| 9,552,515 B2 | 1/2017 | Chan et al. |

(Continued)

OTHER PUBLICATIONS

Jiang, Yu et al., "Chat with Illustration: A Chat System with Visual Aids", ICIMCS' 12, Sep. 9-11, 2012, Wuhan, Hubei, China, 5 pages, ACM Digital Library.

(Continued)

*Primary Examiner* — Sana A Al-Hashemi
(74) *Attorney, Agent, or Firm* — Ference & Associates LLC

(57) ABSTRACT

One embodiment provides a method, including: receiving a query from a user requesting assistance regarding instructions for performing a task; identifying, within steps of the instructions, words that can be visualized, wherein the identifying comprises identifying relationships between terms within the query to generate a step query; retrieving, for each of the steps, a plurality of images representing the identified words; identifying at least one object occurring within the plurality of images corresponding to more than one of the steps; selecting an image for each of the steps of the instructions, wherein the selecting an image comprises selecting an image for each step such that the identified at least one object is represented similarly in each selected image including the identified at least one object; and presenting the instructions as visualized instructions by presenting the selected images for each of the steps in order.

18 Claims, 5 Drawing Sheets

(56) References Cited

U.S. PATENT DOCUMENTS

| | | | |
|---|---|---|---|
| 2007/0147654 A1 | 6/2007 | Clatworthy et al. | |
| 2015/0363481 A1* | 12/2015 | Haynes | G06Q 10/10 707/748 |
| 2016/0171391 A1* | 6/2016 | Guo | G06F 16/24573 706/12 |
| 2018/0260680 A1* | 9/2018 | Finkelstein | G10L 15/22 |
| 2018/0293221 A1* | 10/2018 | Finkelstein | G10L 17/10 |
| 2018/0314689 A1* | 11/2018 | Wang | G10L 15/07 |

OTHER PUBLICATIONS

Unal, Emre, "A Language Visualization System", Thesis, Graduate School of Sciences and Engineering, Koc University, Mar. 2014, 64 pages.

Elhoseiny, Mohamed et al., "Text to Multi-leval MindMaps: A Novel Method for Hierarchical Visual Abstraction of Natural Language Text", Department of Computer Science, Rutgers University, Dec. 23, 2014, 31 pages, Rutgers University, Piscataway, New Jersey, USA.

Coyne, Bob et al., "WordsEye: An Automatic Text-to-Scene Conversion System", Proceedings of the 28th Annual Conference on Computer Graphics and Interactive Techniques, SIGGRAPH '01, 2001, 11 pages, Carnegie Library of Pittsburgh.

Pustejovsky, James et al., "Generating Simulations of Motion Events from Verbal Descriptions", Proceedings of the Third Joint Conference on Lexical and Computational Semantics, SEM 2014, Aug. 23-24, 2014, Dublin, Ireland, 11 pages.

Deepa, S. et al., "Intelligent User Interactive Model for Real Time Text-Graphic Generation", Journal of Theoretical and Applied Information Technology, Jun. 30, 2014, 6 pages, vol. 64, No. 3, JATIT.

Jain, Priyanka et al., "Vishit: A Visualizer for Hindi Text", Fourth International Conference on Communication Systems and Network Technologies, 2014, 5 pages, IEEE Digital Library.

Kim, Gunhee et al., "Ranking and Retrieval of Image Sequences from Multiple Paragraph Queries", Computer Vision Foundation, CVPR, 2015, 9 pages, IEEE Digital Library.

Alcantara, Kim D. et al., "StorVi (Story Visualization): A Text-to-Image Conversion", International Journal of Future Computer and Communication, Oct. 2014, 4 pages, vol. 3, No. 5, IJFCC.

\* cited by examiner

COHESIVE VISUALIZED INSTRUCTION REPRESENTATION

BACKGROUND

A person may be presented with a situation where he/she needs to perform a task but does not know all the steps for properly completing the task. For example, a person may be attempting to make a cup of instant coffee but may not know the steps in order to make the cup of instant coffee. As another example, a person may experience a flat tire while driving and may need to change the tire but may not know what steps to take to change the tire. Thus, the person may attempt to find instructions for performing the desired task. For example, the person may ask another person how to perform the task. As another example, with the increase in mobile technology, the person may have the ability to query an information store (e.g., the Internet, a database, etc.) to find instructions related to the task. The person is then presented with textual steps for completing the desired task.

BRIEF SUMMARY

In summary, one aspect of the invention provides a method comprising: receiving a query from a user requesting assistance regarding instructions for performing a task; identifying, within steps of the instructions, words that can be visualized, wherein the identifying comprises identifying, using a text analysis technique, linguistic relationships between terms within the query to generate a step query; retrieving, for each of the steps, a plurality of images representing the identified words; identifying at least one object occurring within the plurality of images corresponding to more than one of the steps; for each of the steps of the instructions, selecting an image from the plurality of images corresponding to that step, wherein the selecting an image comprises selecting an image for each step such that the identified at least one object is represented similarly in each selected image including the identified at least one object; and presenting the instructions as visualized instructions, by presenting the selected images for each of the steps in order, along with corresponding textual steps.

Another aspect of the invention provides an apparatus, comprising: at least one processor; and a computer readable storage medium having computer readable program code embodied therewith and executable by the at least one processor, the computer readable program code comprising: computer readable program code configured to receive a query from a user requesting assistance regarding instructions for performing a task; computer readable program code configured to identify, within steps of the instructions, words that can be visualized, wherein the identifying comprises identifying, using a text analysis technique, linguistic relationships between terms within the query to generate a step query; computer readable program code configured to retrieve, for each of the steps, a plurality of images representing the identified words; computer readable program code configured to identify at least one object occurring within the plurality of images corresponding to more than one of the steps; computer readable program code configured to for each of the steps of the instructions, select an image from the plurality of images corresponding to that step, wherein the selecting an image comprises selecting an image for each step such that the identified at least one object is represented similarly in each selected image including the identified at least one object; and computer readable program code configured to present the instructions as visualized instructions, by presenting the selected images for each of the steps in order, along with corresponding textual steps.

An additional aspect of the invention provides a computer program product, comprising: a computer readable storage medium having computer readable program code embodied therewith, the computer readable program code executable by a processor and comprising: computer readable program code configured to receive a query from a user requesting assistance regarding instructions for performing a task; computer readable program code configured to identify, within steps of the instructions, words that can be visualized, wherein the identifying comprises identifying, using a text analysis technique, linguistic relationships between terms within the query to generate a step query; computer readable program code configured to retrieve, for each of the steps, a plurality of images representing the identified words; computer readable program code configured to identify at least one object occurring within the plurality of images corresponding to more than one of the steps; computer readable program code configured to for each of the steps of the instructions, select an image from the plurality of images corresponding to that step, wherein the selecting an image comprises selecting an image for each step such that the identified at least one object is represented similarly in each selected image including the identified at least one object; and computer readable program code configured to present the instructions as visualized instructions, by presenting the selected images for each of the steps in order, along with corresponding textual steps.

A further aspect of the invention provides a method, comprising: representing steps of an instruction as visual instructions comprising (i) a plurality of images for each of the steps instructions and (ii) corresponding text, wherein the plurality of images comprise images that contain cohesive features between the steps; the representing the steps comprising: identifying, within each of the steps, terms to be represented by at least one image; retrieving a plurality of images for each of the steps by (i) generating a query for each of the identified terms and (ii) querying, using the query, a database for a plurality of images; and selecting an image for each of the steps, wherein images selected for steps having similar objects comprise images where the object in each image is represented similarly across the steps.

For a better understanding of exemplary embodiments of the invention, together with other and further features and advantages thereof, reference is made to the following description, taken in conjunction with the accompanying drawings, and the scope of the claimed embodiments of the invention will be pointed out in the appended claims.

DETAILED DESCRIPTION

Figure 1:
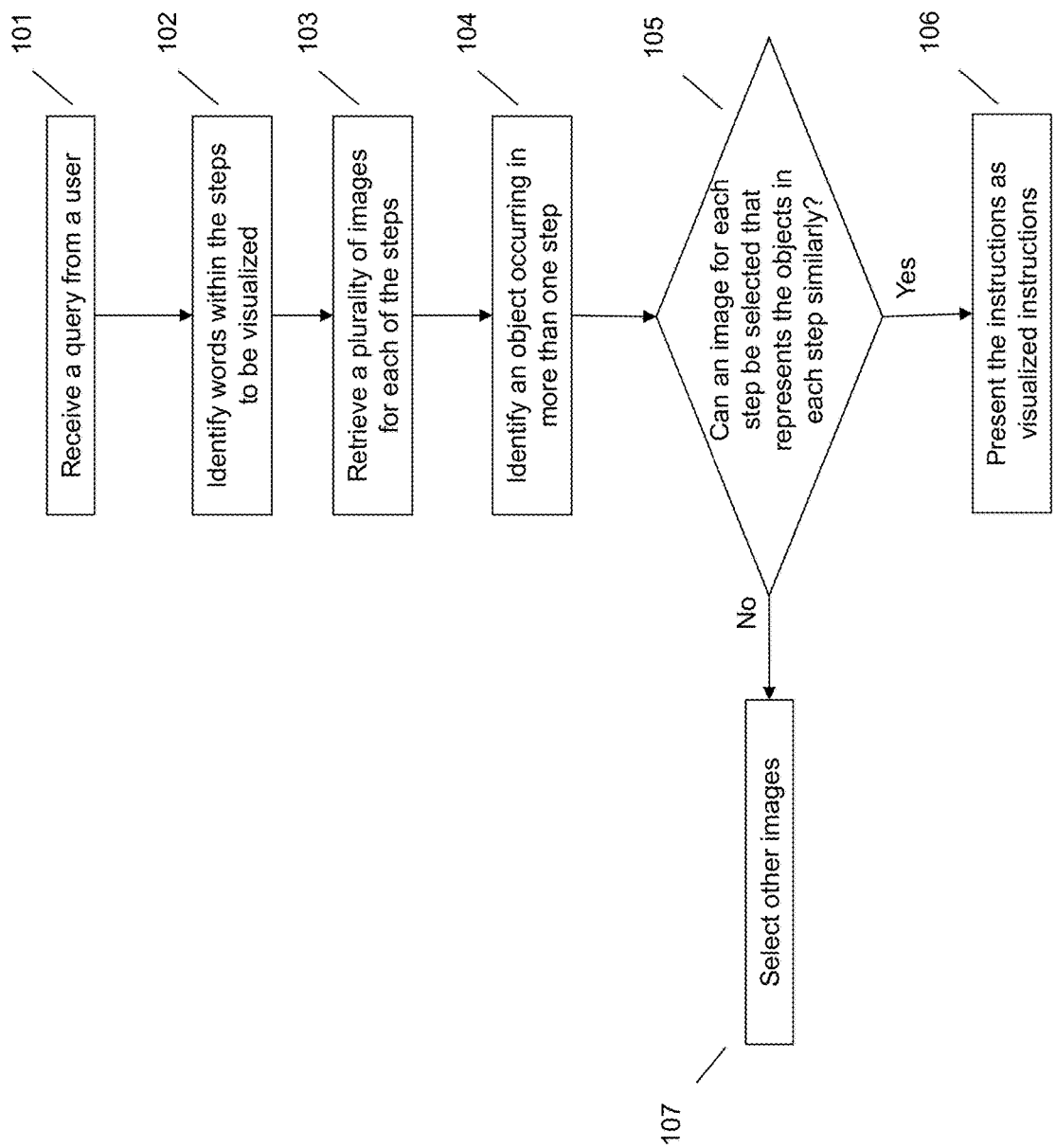
FIG. 1 illustrates a method of representing steps of instructions as a series of cohesive images.

It will be readily understood that the components of the embodiments of the invention, as generally described and illustrated in the figures herein, may be arranged and designed in a wide variety of different configurations in addition to the described exemplary embodiments. Thus, the following more detailed description of the embodiments of the invention, as represented in the figures, is not intended to limit the scope of the embodiments of the invention, as claimed, but is merely representative of exemplary embodiments of the invention.

Reference throughout this specification to "one embodiment" or "an embodiment" (or the like) means that a particular feature, structure, or characteristic described in connection with the embodiment is included in at least one embodiment of the invention. Thus, appearances of the phrases "in one embodiment" or "in an embodiment" or the like in various places throughout this specification are not necessarily all referring to the same embodiment.

Furthermore, the described features, structures, or characteristics may be combined in any suitable manner in at least one embodiment. In the following description, numerous specific details are provided to give a thorough understanding of embodiments of the invention. One skilled in the relevant art may well recognize, however, that embodiments of the invention can be practiced without at least one of the specific details thereof, or can be practiced with other methods, components, materials, et cetera. In other instances, well-known structures, materials, or operations are not shown or described in detail to avoid obscuring aspects of the invention.

The illustrated embodiments of the invention will be best understood by reference to the figures. The following description is intended only by way of example and simply illustrates certain selected exemplary embodiments of the invention as claimed herein. It should be noted that the flowchart and block diagrams in the figures illustrate the architecture, functionality, and operation of possible implementations of systems, apparatuses, methods and computer program products according to various embodiments of the invention. In this regard, each block in the flowchart or block diagrams may represent a module, segment, or portion of code, which comprises at least one executable instruction for implementing the specified logical function(s).

It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Specific reference will be made here below to FIGS. 1-5. It should be appreciated that the processes, arrangements and products broadly illustrated therein can be carried out on, or in accordance with, essentially any suitable computer system or set of computer systems, which may, by way of an illustrative and non-restrictive example, include a system or server such as that indicated at 12' in FIG. 5. In accordance with an example embodiment, all of the process steps, components and outputs discussed with respect to FIGS. 1-4 can be performed or utilized by way of a processing unit or units and system memory such as those indicated, respectively, at 16' and 28' in FIG. 5, whether on a server computer, a client computer, a node computer in a distributed network, or any combination thereof.

A problem with receiving textual instructions is that the person may be unfamiliar with particular terms that may be included in the instructions. For example, if the person is attempting to change a flat tire and one of the steps of the instructions indicates that the lug nuts should be loosened and removed, the person may not know what lug nuts are or what they look like. Thus, the person may struggle with this step and may be ultimately unable to complete the task. Another problem with receiving textual instructions is that the instructions may be presented in a language that is foreign to the person. For example, if a person is traveling in another country, when the person conducts a query, the resulting instructions may be presented in the language of the country that the person is currently located within. Even using a translator as provided on the mobile device may not assist the person because the words may be translated to words that are unfamiliar to the person. For example, a term that is used in one country may not be the same term that is used to describe the same object in another country.

One traditional solution for these problems is to attempt to find images that are related to the instructions. In other words, the person may perform a query to search for images that are related to the instructions. For example, if the person is presented with an unfamiliar term in the instructions, the person may query an information store to find an image that corresponds to the unfamiliar term. However, this requires extra time and resources being expended by the user. Additionally, requiring additional queries may be problematic for the person. For example, the person's hands may be dirty and, therefore, the person does not want to touch the mobile device. Another problem is that because the person is searching for the images, the images that are returned for each of the steps responsive to the user query may end up being confusing. For example, the person may search for an image corresponding to a first step of the instructions which may return an image have a picture of an object. The person may then search for an image for the second step. Even though the second step may include an entity or object that is common from the first step, the image that is returned for the second step may show a completely different object than the object within the image for the first step. Thus, the person may become confused and may then have a difficult time performing the instructions.

Accordingly, the techniques and systems as described herein provide a system and technique for representing instructions as visualized instructions comprising a series of cohesive images. The system may receive a query from a user requesting assistance regarding instructions for performing a task. The query may simply include a request for steps for performing a task or may also include the textual steps for performing the task. For example, the user may be following a recipe or instruction book and may already have the steps for the instructions but may be unfamiliar with terms in the steps or may be unfamiliar with how to perform any or all of the steps. Thus, the user may provide the textual instructions to the system in addition to providing a query requesting assistance with the performance of the instructions.

The system may identify words within the steps of the instructions that can be visualized. In other words, the system may identify the terms within the steps where an image would be helpful in understanding the term or step. The system may then create a query using these identified words to find a plurality of images for each of the steps within the instructions. From the plurality of images the system may identify at least one object that occurs across multiple steps of the instructions. For example, the system may identify that the images for one step generally contain a coffee cup and the system may also identify that the images for another step also generally contain a coffee cup. For these steps that have reoccurring objects, the system may select an image for each of the steps where the selected image for each of the steps includes an object that is similar to the object occurring in the other images for the other steps. In other words, the system may select images for each of the steps so that the objects within the images are cohesive and similar across all the images for the steps having that object. The system may then present the instructions as visualized instructions with the selected images for each step and the corresponding textual instructions. Additionally, the system is able to highlight terms within the textual steps that may require extra care or attention by the user, for example, cautionary terms, special instructions, unique ingredients, step dependency, or the like.

Such a system provides a technical improvement over current systems for presentation of instructions for performing a task. Rather than merely providing textual instructions, as in many conventional techniques, the system can present the instructions with images corresponding to the steps. Unlike traditional techniques where a person has to search for images corresponding to unfamiliar terms or unfamiliar steps, the described system and method automatically returns images along with the textual instructions. Additionally, the system is able to identify entities and objects within each of the images and return images for the steps that are cohesive between each step. Thus, when the person accesses and uses the instructions, the person will not become confused due to images that have different depictions of the same object across the multiple steps. Accordingly, the described system and methods provide a technique that is more convenient for a person and less time-consuming for that person. Additionally, since the images are cohesive across the multiple steps, the instructions are presented in a manner that is less confusing for the person and allows the person the ability to perform the desired task without confusion and frustration. Additionally, the system provides a technique for automatically highlighting terms within the instructions that should be brought to the attention of the person performing the task. Thus, the person can be made aware of steps that need extra attention or care in a manner that is not contemplated using conventional techniques.

FIG. 1 illustrates a method for representing instructions as visualized instructions comprising a series of cohesive images. At 101 the system may receive a query from a user requesting assistance regarding instructions for performing a task. The query may include textual instructions or steps for performing the desired task. For example, the user may be performing a task where he/she already has the textual instructions. However, the user may be confused or may not understand the textual instructions. Therefore, the user provides a query to the system to assist with the instructions. Since the user already has the textual instructions, the user may not only provide the query, but may also provide the textual steps of the instructions to the system. The query and/or the textual steps may be provided by the user using any of a variety of input provision techniques, for example, a user providing input through a soft keyboard, mechanical keyboard, providing an image of the query and/or textual steps, through audio input, or the like. In the case that an image is provided, the system may use a text recognition technique, for example, optical character recognition technique, to recognize the text and extract the relevant query and/or steps.

Alternatively, the query received from the user may include a simple query that requests instructions and steps for performing a task. For example, the user may provide a query stating "How do you make instant coffee?" This query may be provided using any of the previously described techniques. Once the query is provided the system may extract terms or keyword from the query. The system may use these extracted terms or keywords to query an information storage location (e.g., the Internet, a database, etc.) for documents relevant to the query. From the documents the system can extract text relevant to the query using a specified keyword, for example, an action word (e.g., do, make, put, etc.) or other term that increases the likelihood of retrieving text relevant to an instruction set or steps for the query. The system can create a dependency graph for the extracted text that identifies extracted text that is dependent upon other extracted text and also identifies instruction step dependencies. The system can then find the minimal subset of the dependency graph to get the sequence of steps for the instruction set.

Once the steps of the instructions are obtained or identified, the system may identify words within the steps of the instructions that can be visualized at 102. Words within the steps that can be visualized include those words that identify what the image corresponding to the instruction step should contain. In other words, the words to be visualized include those words within the steps where an image illustrating or representing those words would assist in understanding the step. To identify these words the system may use a text analytics technique, for example, natural language processing, semantic analysis, syntactic analysis, information extraction, and the like, on the query. The system may use one or more text analytics techniques to identify what each of the words within each step is attempting to convey. The text analytics techniques may also allow the system to identify the linguistic relationship between the words within a step.

Figure 2:
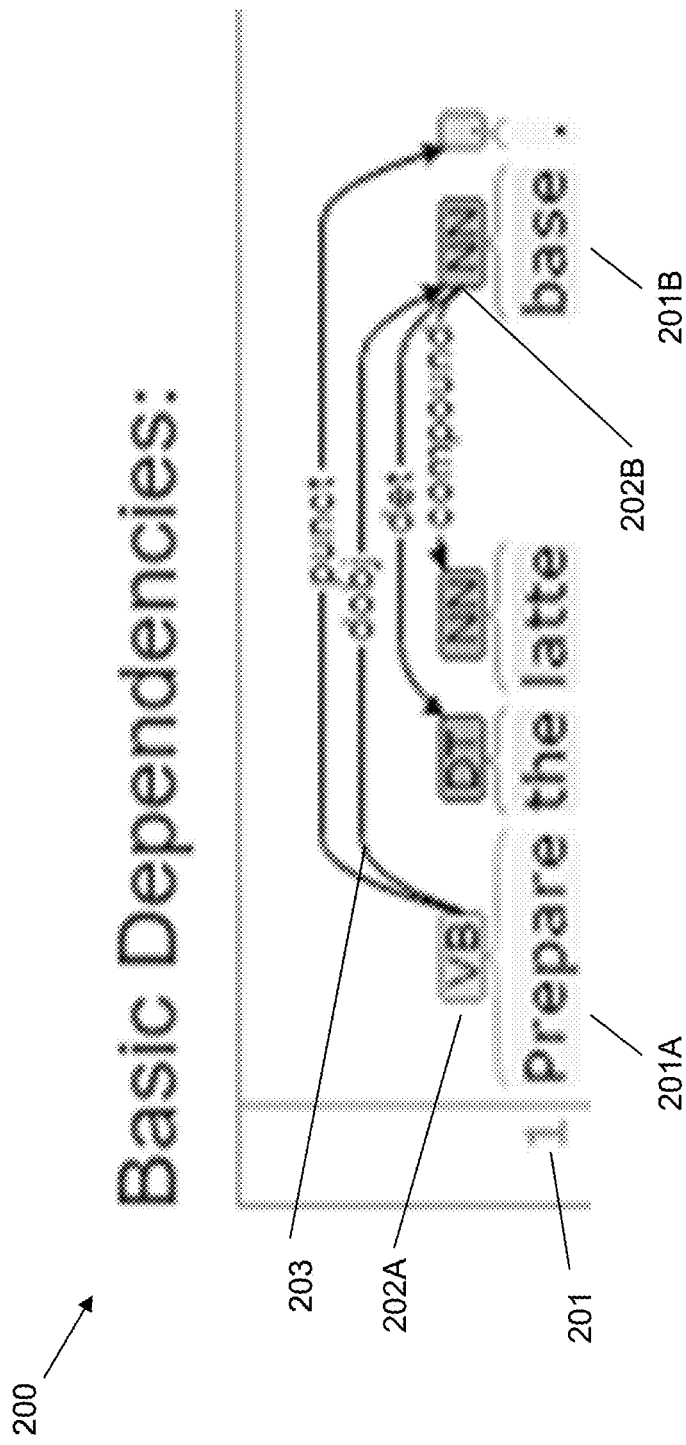
FIG. 2 illustrates an example of a text analysis relationship representation.

Using the example of FIG. 2 that illustrates a text analysis a step 201 for preparing coffee which includes "prepare the latte base," the system may identify the role of each of the words in the step 201. For example, the system has identified the role of the word "prepare" 201A as a verb 202A within the step 201. The system similarly identifies the roles of the remaining words within the step 201. Then the system may identify the linguistic relationship between words within the step 201. For example, the system may identify that the verb 202 "prepare" 201A is a direct object 203 of the noun 202B "base" 201B.

After the system has identified the words that can be visualized and the linguistic relationship between the words within the steps, the system can then create a query corresponding to each of the steps, referred to as a "step query" for ease of readability. The step query can be used by the system to search one or more information stores (e.g., database, Internet, network data storage location, image storage location, etc.) for images corresponding to each of the steps at 103. Thus, the system retrieves a plurality of images for each of the steps using the step query that is generated from the identified words. The retrieved images do not all have to be from a single information store. In other words, the plurality of images, even for a single step, can include images that are retrieved from more than a single information store.

At 104 the system may identify at least one object that occurs across multiple steps of the instructions. In other words, the system may find the entities or objects that are related within the steps and determine if the entity or object is being used in another step of the instructions. To identify whether an object occurs across multiple steps, the system may analyze the words that were identified for visualization across multiple steps to determine if any of these words or terms occur within different steps. To identify whether the object occurs across multiple steps may include extracting non-latent entities using a dependency parser as part of the text analysis techniques. The system may then keep track of the non-latent entities across instructions which allows for extraction of the latent entities. For example, part of this determination may include identifying if some objects do not appear within the textual representation of the step, but would be inherent in the step. For example, if the step states "add a spoonful of coffee," the system may determine that a cup is inherent in this step even though it is not explicitly mentioned in the step. Thus, the system may identify that the step includes a "cup" object even though the step does not explicitly recite the "cup" object.

Another technique for determining if an object occurs across multiple steps is to analyze at least a subset of the images for each step to determine if an object reoccurs across more than one of the steps. For example, if the system identifies that a subset of the images for a step that states "pour hot water into a cup" and a subset of the images for a step that states "add a spoonful of coffee" all include a cup, the system may then determine that the cup is a reoccurring object across both of these steps.

At 105 the system may then determine if images can be selected for each of steps that ensure consistency or cohesiveness in the images across the multiple steps. In other words, the system may determine if images can be selected for each step where objects that occur in images for multiple steps are represented similarly in each of the images for each of the steps. To select the images for each of the steps to represent the objects similarly the system may identify different features of the object and attempt to select images for each of the steps that represent these features similarly. Features of the object may include any visual feature, for example, color, shape, texture, scene, object, person, and the like. Each of these features may be represented as a kernel. The system can then use various machine learning algorithms, for example, multiple kernel learning, convolutional neural network, or the like, to learn the best representation of these features within images.

Figure 3:
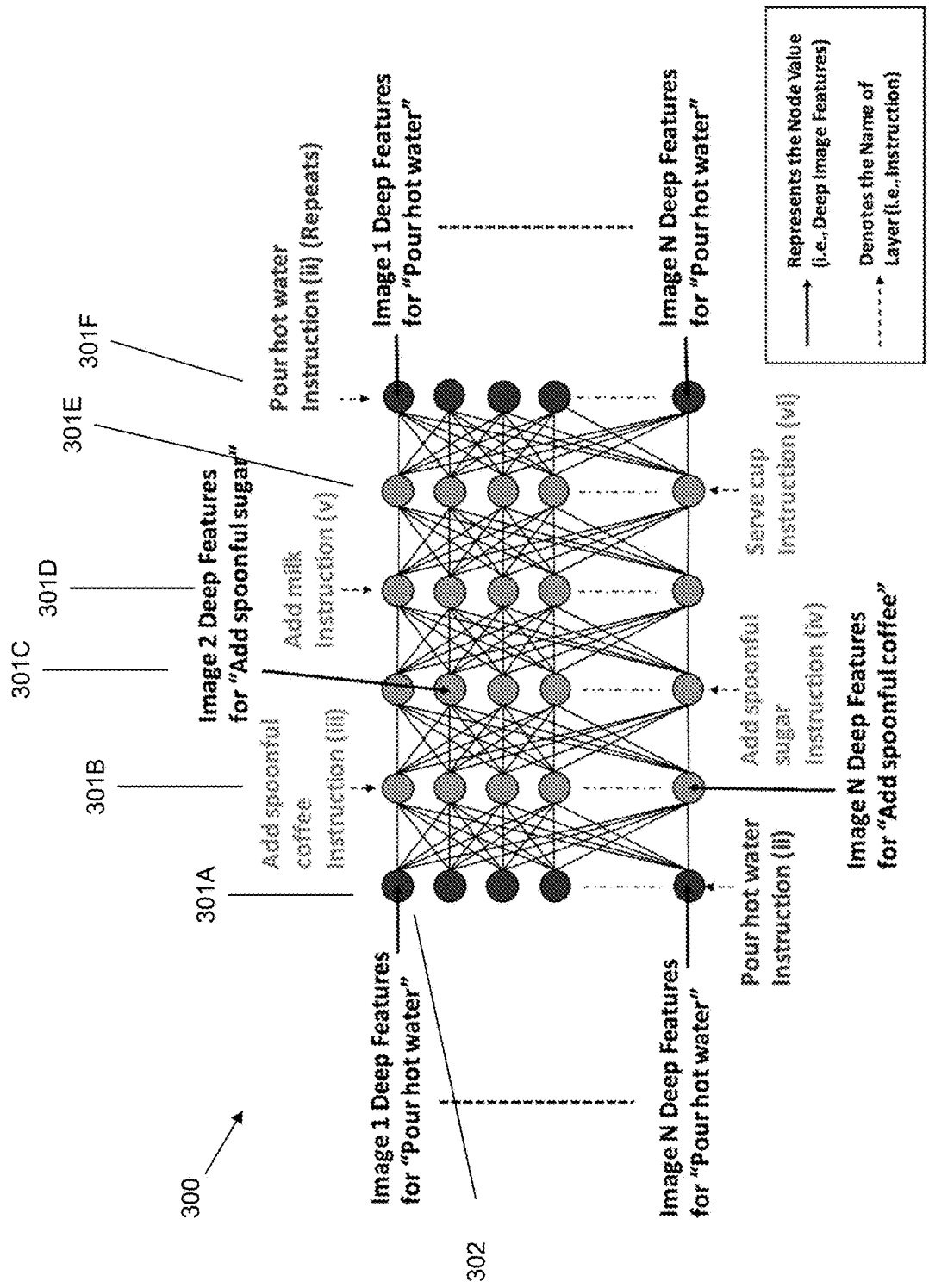
FIG. 3 illustrates an example graphical representation of the images for the plurality of steps.

The system may also generate a graphical representation that includes a plurality of nodes organized in a grid-like pattern having a plurality of columns and rows, for example, as illustrated in FIG. 3 at 300. Even though FIG. 3 illustrates this graphical representation as a series of rows and columns, different configurations are possible, for example, groups, layers, or the like. The columns in the graphical representation may represent each of the steps within the instructions, as illustrated in the example of FIG. 3 at 301A-301F, with each column corresponding to a step within the instructions. Additionally, as illustrated in FIG. 3, the ordering of the columns corresponds to the sequence of the steps within the instructions. If one of the steps does not include a reoccurring object, that step may not be included in the graphical representation. In other words, the graphical representation is used to identify images for the steps having the same reoccurring object. The rows correspond to one of the images that was retrieved for the corresponding column step. It should be understood that the columns and rows may be reversed, with the column representing the image number and the rows representing the instruction step. Thus, each of the nodes 302 corresponds to one of the plurality of retrieved images that corresponds to the step of the column where the node is located and contains a feature corresponding to the image associated with the node 302.

The graphical representation may include an extra column or layer that corresponds to the first step of the instruction placed as the last column within the graphical representation. In other words, the graphical representation may include the first step as both the first column and the last column. This helps to ensure cohesiveness between the last step and the first step that share the object. Alternatively, the graph may simply have a number of columns that correspond to the number of steps that include the reoccurring entity and may include a connection (e.g., edges) between the first column corresponding to the first step having the object and the last column corresponding to the last step having the object.

The system may then generate edges for the graphical representation between each node of adjacent columns. In other words, each node of a single column is connected by an edge to each node in an adjacent column. Each of the generated edges includes a similarity score that identifies the similarity between features of the nodes connected by the edge. The similarity score or edge weight may be calculated by calculating the Euclidean distance between the corresponding image features of the images represented by the connected nodes. Once the graph is constructed the system can then select images for each of the steps. To select the images for each step, the system may identify a path from the first step column to the last step column that traverses an image for each of steps, where the traversed nodes represent the images to be selected for the corresponding step. To find the most cohesive images across the steps, the system may identify a path where the images have the highest similarity scores or the lowest distance score. In other words, the system identifies the path that traverses the edges having the highest calculated similarity score or the lowest distance score. To find the shortest path, the system may use a Dijkstra algorithm. A graphical representation may be created for each entity that is common between steps. In other words, the instruction set may include multiple objects or entities that occur across multiple steps. For each of these entities or objects, the system would generate a graphical representation and identify a path between the steps.

In the case where an object only occurs within a single step, the system may attempt to select an image that has the best possible representation of the step. In this case the system may extract the image features from all the images that were retrieved for the step. The system may then find the mean or average representation of these features across the plurality of images. The system then identifies the image that is farthest from the mean or average representation and removes this image from the possible images for selection. The system may then recalculate a mean or average representation using the remaining images and remove the image that is farthest from this new mean or average representation. The system may continue these steps iteratively until only a single image remains. This image may then be selected as the image that will be used for representing this step in the visualized instructions.

If the system cannot select images that represent the objects similarly across the steps at 104, the system may either select other images at 107 or may retrieve additional images at 103. Determining if the objects are represented similarly across the images may include comparing the similarity scores or distance scores to a threshold score, for example, a threshold score identified by a user, a default threshold score, or the like. If the similarity score or distance scores do not meet this threshold, the system may determine that the images do not represent the objects similarly enough and may then revert to selecting other images at 107 or retrieving new images at 103.

Figure 4:
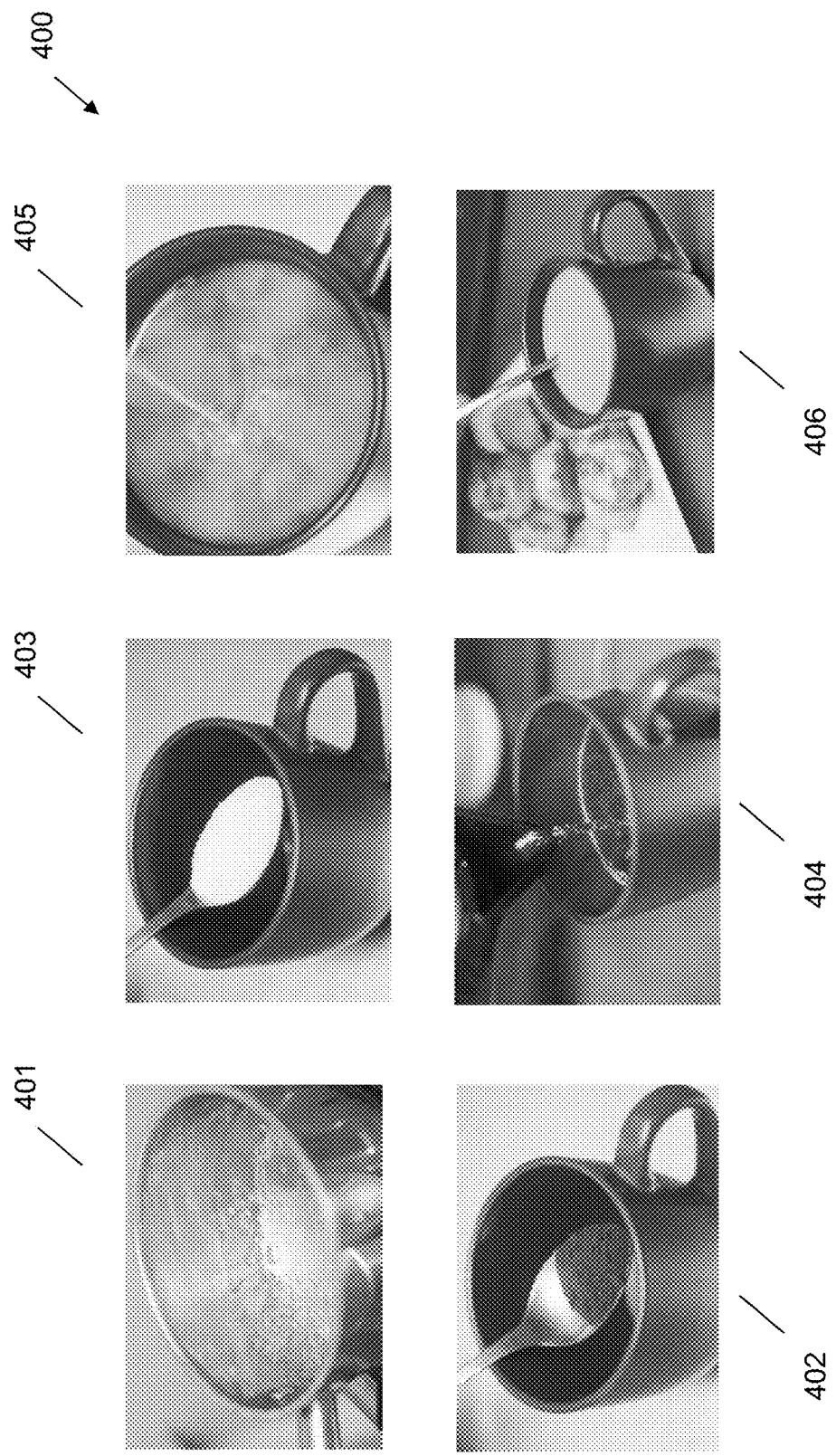
FIG. 4 illustrates an example of cohesive visualized instructions.

If, however, images for each of the steps can be selected that represent the objects similarly across the steps at 105, the system may present the instructions as visualized instructions at 106. Presenting or representing the instructions as visualized instructions may include presenting the selected images for each of the steps, for example, as illustrated in FIG. 4 at 400 in order of the steps. Presentation or representation of the visualized instructions may include corresponding textual steps, which are not illustrated in FIG. 4 for clarity. FIG. 4 represents the visualized instructions 400 for the example of preparing coffee. Image 401 represents the step of "boil water." Image 402 represents the step "add coffee to the cup." Image 403 represents the step "add sugar to the cup." Image 404 represents the step "add hot water to the cup." Image 405 represents "add some milk or cream." Image 406 represents "stir the coffee and serve." As can be seen by the chosen images, the "cup" object is similarly represented across all of the steps that include the object. This cohesiveness between the images reduces the confusion that may be experienced by a user by ensuring that the user understands that the addition of ingredients within the cup are all additions within the same cup and not additions in other cups.

In presenting the instructions as visualized instructions, the system may also highlight words or terms in the textual steps or the image corresponding to the textual step that should be brought to the attention of the user. For example, the step may include cautionary words (e.g., "hot", "danger", "flammable", "corrosive", etc.), may include terms that identify a step dependency (e.g., this step must be performed before this other step), include terms that convey an urgency to the user (e.g., "serve immediately", "quickly", "within 5 seconds", etc.), or any other term that the user should pay special attention to. To identify these words, the system may compare the words included in each step to a list of previously identified terms. If the term is included in the list or a similar word is included in the list, the system may then determine that the term should be highlighted. In highlighting these terms the system may change the color of the text of the term, add an image around the term or the step image (e.g., add an image of fire for "hot", add a picture of a timer for an urgent step, etc.), put a box around the word, or use any other technique that would bring the attention of the user to the word.

Thus, the described system and method provide an improvement over a conventional system for instruction presentation by providing a system that automatically provides images for each of the textual steps, thereby providing a more efficient system than traditional techniques. Additionally, the system presents images that include object representations that are cohesive across the steps containing the object, thereby reducing confusion by a user. Finally, the system is automatically able to highlight words or terms included in the steps that should be brought to the attention of the user, which is not possible in conventional techniques.

Figure 5:
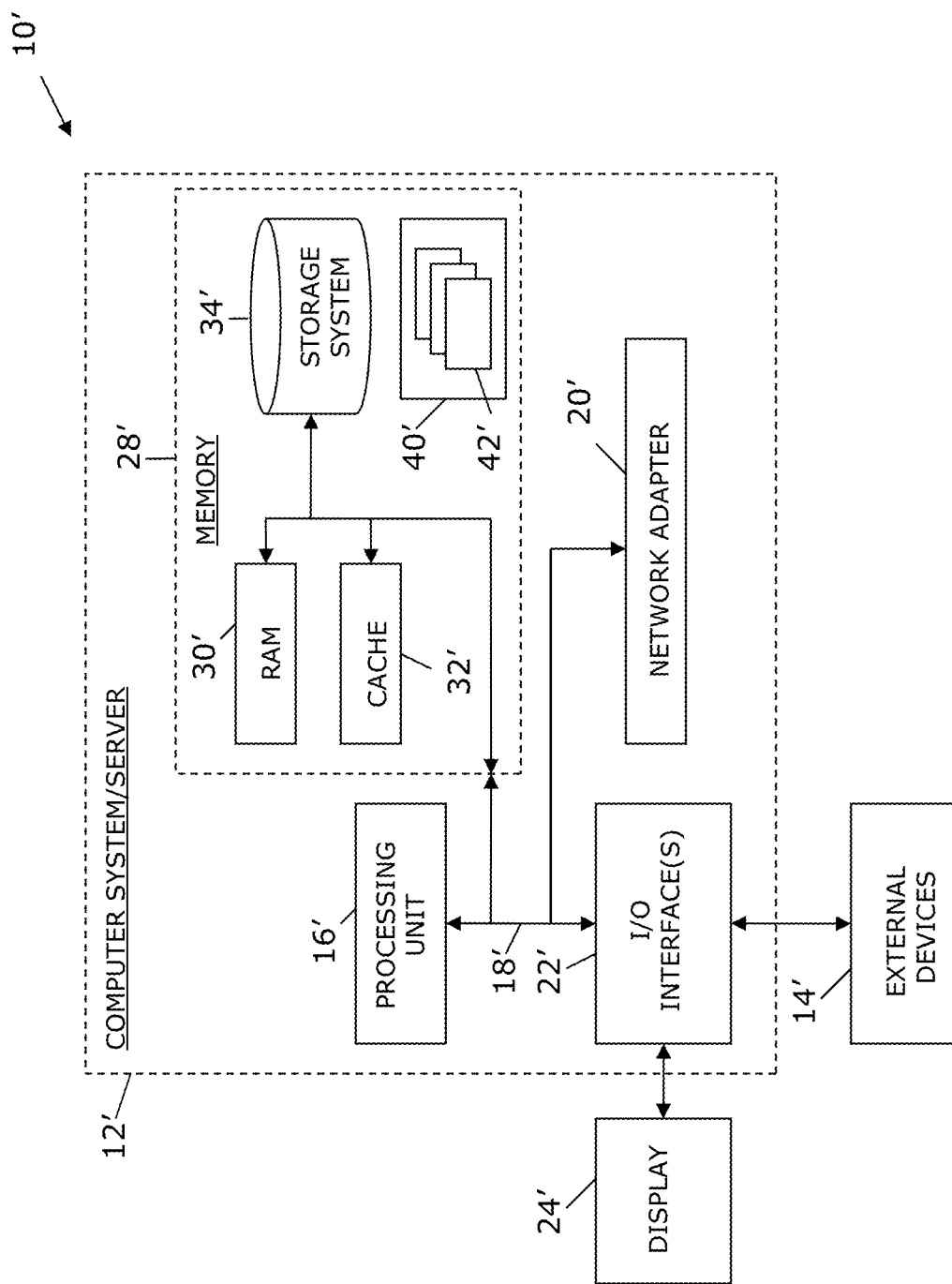
FIG. 5 illustrates a computer system.

As shown in FIG. 5, computer system/server 12' in computing node 10' is shown in the form of a general-purpose computing device. The components of computer system/server 12' may include, but are not limited to, at least one processor or processing unit 16', a system memory 28', and a bus 18' that couples various system components including system memory 28' to processor 16'. Bus 18' represents at least one of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12' typically includes a variety of computer system readable media. Such media may be any available media that are accessible by computer system/server 12', and include both volatile and non-volatile media, removable and non-removable media.

System memory 28' can include computer system readable media in the form of volatile memory, such as random access memory (RAM) 30' and/or cache memory 32'. Computer system/server 12' may further include other removable/non-removable, volatile/non-volatile computer system storage media. By way of example only, storage system 34' can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18' by at least one data media interface. As will be further depicted and described below, memory 28' may include at least one program product having a set (e.g., at least one) of program modules that are configured to carry out the functions of embodiments of the invention.

Program/utility 40', having a set (at least one) of program modules 42', may be stored in memory 28' (by way of example, and not limitation), as well as an operating system, at least one application program, other program modules, and program data. Each of the operating systems, at least one application program, other program modules, and program data or some combination thereof, may include an implementation of a networking environment. Program modules 42' generally carry out the functions and/or methodologies of embodiments of the invention as described herein.

Computer system/server 12' may also communicate with at least one external device 14' such as a keyboard, a pointing device, a display 24', etc.; at least one device that enables a user to interact with computer system/server 12'; and/or any devices (e.g., network card, modem, etc.) that enable computer system/server 12' to communicate with at least one other computing device. Such communication can occur via I/O interfaces 22'. Still yet, computer system/server 12' can communicate with at least one network such as a local area network (LAN), a general wide area network (WAN), and/or a public network (e.g., the Internet) via network adapter 20'. As depicted, network adapter 20' communicates with the other components of computer system/server 12' via bus 18'. It should be understood that although not shown, other hardware and/or software components could be used in conjunction with computer system/server 12'. Examples include, but are not limited to: microcode, device drivers, redundant processing units, external disk drive arrays, RAID systems, tape drives, and data archival storage systems, etc.

This disclosure has been presented for purposes of illustration and description but is not intended to be exhaustive or limiting. Many modifications and variations will be apparent to those of ordinary skill in the art. The embodiments were chosen and described in order to explain principles and practical application, and to enable others of ordinary skill in the art to understand the disclosure.

Although illustrative embodiments of the invention have been described herein with reference to the accompanying drawings, it is to be understood that the embodiments of the invention are not limited to those precise embodiments, and that various other changes and modifications may be affected therein by one skilled in the art without departing from the scope or spirit of the disclosure.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method, comprising:
receiving, at a system from an input provision component, a query from a user requesting assistance regarding instructions for performing a task;
identifying, using a text analytics component of the system and within steps of the instructions, words that can be visualized, wherein the identifying comprises identifying, using a text analysis technique, a role of terms within the query and identifying, from the role of the terms, linguistic relationships between the terms within the query to generate a step query, wherein the steps of the instructions are identified from the query via (i) extracting terms from the query, (ii) querying, using the extracted terms, an information storage location, (iii) receiving, responsive to the querying, documents from the information storage location, (iv) extracting, from the received documents, text relevant to the query, (v) creating, from the extracted text, a dependency graph identifying extracted text that is dependent upon other of the extracted text and instruction step dependencies, and (vi) finding a minimal subset of the dependency graph to identify the steps;
retrieving, using the system and from one or more information stores and for each of the steps, a plurality of images representing the identified words, wherein the retrieving comprises querying, using the step query, the one or more information stores comprising images;
identifying, using an analysis component of the system, at least one object occurring within the plurality of images corresponding to more than one of the steps, wherein the identifying comprises identifying an object occurring in one of the steps that corresponds to an object occurring in another of the steps by extracting, utilizing a dependency parser, non-latent entities and extracting latent entities by tracking the non-latent entities across the steps;
for each of the steps of the instructions, selecting, using an image analysis component of the system, an image from the plurality of images corresponding to that step, wherein the selecting an image comprises selecting an image for each step such that the identified at least one object is represented similarly in each selected image including the identified at least one object, wherein the selecting comprises identifying features of the identified at least one object within an image, representing each of the features as a kernel, and learning, using a machine learning algorithm on the kernels, a representation of each of the features within the images across steps; and
presenting, on a display, the instructions as visualized instructions, by presenting the selected images for each of the steps in order, along with corresponding textual steps.

2. An apparatus, comprising:
at least one processor; and
a computer readable storage medium having computer readable program code embodied therewith and executable by the at least one processor, the computer readable program code comprising:
computer readable program code configured to receive, at a system from an input provision component, a query from a user requesting assistance regarding instructions for performing a task;
computer readable program code configured to identify, using a text analytics component of the system and within steps of the instructions, words that can be visualized, wherein the identifying comprises identifying, using a text analysis technique, a role of terms within the query and identifying, from the role of the terms, linguistic relationships between the terms within the query to generate a step query, wherein the steps of the instructions are identified from the query via (i) extracting terms from the query, (ii) querying, using the extracted terms, an information storage location, (iii) receiving, responsive to the querying, documents from the information storage location, (iv) extracting, from the received documents, text relevant to the query, (v) creating, from the extracted text, a dependency graph identifying extracted text that is dependent upon other of the extracted text and instruction step dependencies, and (vi) finding a minimal subset of the dependency graph to identify the steps;
computer readable program code configured to retrieve, using the system and from one or more information stores and for each of the steps, a plurality of images representing the identified words, wherein the retrieving comprises querying, using the step query, the one or more information stores comprising images;
computer readable program code configured to identify, using an analysis component of the system, at least one object occurring within the plurality of images corresponding to more than one of the steps, wherein the identifying comprises identifying an object occurring in one of the steps that corresponds to an object occurring in another of the steps by extracting, utilizing a dependency parser, non-latent entities and extracting latent entities by tracking the non-latent entities across the steps;
computer readable program code configured to for each of the steps of the instructions, select, using an image analysis component of the system, an image from the plurality of images corresponding to that step, wherein the selecting an image comprises selecting an image for each step such that the identified at least one object is represented similarly in each selected image including the identified at least one object, wherein the selecting comprises identifying features of the identified at least one object within an image, representing each of the features as a kernel, and learning, using a machine learning algorithm on the kernels, a representation of each of the features within the images across steps; and
computer readable program code configured to present, on a display, the instructions as visualized instructions, by presenting the selected images for each of the steps in order, along with corresponding textual steps.

3. A computer program product, comprising:
a computer readable storage medium having computer readable program code embodied therewith, the computer readable program code executable by a processor and comprising:
computer readable program code configured to receive, at a system from an input provision component, a query from a user requesting assistance regarding instructions for performing a task;
computer readable program code configured to identify, using a text analytics component of the system and within steps of the instructions, words that can be visualized, wherein the identifying comprises identifying, using a text analysis technique, a role of terms within the query and identifying, from the role of the terms, linguistic relationships between the terms within the query to generate a step query, wherein the steps of the instructions are identified from the query via (i) extracting terms from the query, (ii) querying, using the extracted terms, an information storage location, (iii) receiving, responsive to the querying, documents from the information storage location, (iv) extracting, from the received documents, text relevant to the query, (v) creating, from the extracted text, a dependency graph identifying extracted text that is dependent upon other of the extracted text and instruction step dependencies, and (vi) finding a minimal subset of the dependency graph to identify the steps;

computer readable program code configured to retrieve, using the system and from one or more information stores and for each of the steps, a plurality of images representing the identified words, wherein the retrieving comprises querying, using the step query, the one or more information stores comprising images;

computer readable program code configured to identify, using an analysis component of the system, at least one object occurring within the plurality of images corresponding to more than one of the steps, wherein the identifying comprises identifying an object occurring in one of the steps that corresponds to an object occurring in another of the steps by extracting, utilizing a dependency parser, non-latent entities and extracting latent entities by tracking the non-latent entities across the steps;

computer readable program code configured to for each of the steps of the instructions, select, using an image analysis component of the system, an image from the plurality of images corresponding to that step, wherein the selecting an image comprises selecting an image for each step such that the identified at least one object is represented similarly in each selected image including the identified at least one object, wherein the selecting comprises identifying features of the identified at least one object within an image, representing each of the features as a kernel, and learning, using a machine learning algorithm on the kernels, a representation of each of the features within the images across steps; and computer readable program code configured to present, on a display, the instructions as visualized instructions, by presenting the selected images for each of the steps in order, along with corresponding textual steps.

4. A method, comprising:

representing, at a display of a system, steps of an instruction as visual instructions comprising (i) a plurality of images for each of the steps instructions and (ii) corresponding text, wherein the plurality of images comprise images that contain cohesive features between the steps, wherein the steps of the instructions are identified from a query requesting assistance with the steps of the instructions via (i) extracting terms from the query, (ii) querying, using the extracted terms, an information storage location, (iii) receiving, responsive to the querying, documents from the information storage location, (iv) extracting, from the received documents, text relevant to the query, (v) creating, from the extracted text, a dependency graph identifying extracted text that is dependent upon other of the extracted text and instruction step dependencies, and (vi) finding a minimal subset of the dependency graph to identify the steps;

the representing the steps comprising:

identifying, using a text analytics component of the system and within each of the steps, terms to be represented by at least one image, wherein the identifying comprises identifying, using a text analysis technique, a role of terms within the query and identifying, from the role of the terms, linguistic relationships between the terms within the query;

retrieving, using the system and from at least one database, a plurality of images for each of the steps by (i) generating, from the linguistic relationships between the terms, a step query for each of the identified terms and (ii) querying, using the step query, the at least one database for a plurality of images; and selecting, using an analysis component of the system, an image for each of the steps, wherein images selected for steps having similar objects comprise images where the object in each image is represented similarly across the steps, wherein identifying similar objects comprises identifying an object occurring in one step that corresponds to an object occurring in another of the steps by extracting, utilizing a dependency parser, non-latent entities and extracting latent entities by tracking the non-latent entities across the steps, wherein the selecting comprises identifying features of a similar object within an image, representing each of the features as a kernel, and learning, using a machine learning algorithm on the kernels, a representation of each of the features within the images across steps.

5. The method of claim 1, wherein the steps of the instructions are provided by a user.

6. The method of claim 1, wherein the identifying at least one object comprises identifying more than one step of the instruction that comprises an identified word.

7. The method of claim 1, wherein the selecting an image comprises constructing a graphical representation having a plurality of nodes organized as a plurality of columns and rows, each column corresponding to a step having the identified at least one object and each node representing one of the plurality of images corresponding to the step of the corresponding column.

8. The method of claim 1, wherein the selecting an image comprises (i) identifying a step having a unique object with respect to the other steps, (ii) extracting a plurality of features of the unique object from the plurality of images having the unique object, and (iii) iteratively identifying an average representation of each of the plurality of features for the plurality of images and removing the image from the plurality of images furthest from the average representation until a single image remains.

9. The method of claim 1, wherein the presenting comprises highlighting words, within the corresponding textual steps, identified as words that should be brought to the attention of the user.

10. The computer program product of claim 3, wherein the steps of the instructions are provided by a user.

11. The computer program product of claim 3, wherein the identifying at least one object comprises identifying more than one step of the instruction that comprises an identified word.

12. The computer program product of claim 3, wherein the selecting an image comprises constructing a graphical representation having a plurality of nodes organized as a plurality of columns and rows, each column corresponding to a step having the identified at least one object and each node representing one of the plurality of images corresponding to the step of the corresponding column.

13. The computer program product of claim 3, wherein the selecting an image comprises (i) identifying a step having a unique object with respect to the other steps, (ii) extracting a plurality of features of the unique object from the plurality of images having the unique object, and (iii) iteratively identifying an average representation of each of the plurality of features for the plurality of images and removing the image from the plurality of images furthest from the average representation until a single image remains.

14. The method of claim 7, wherein the selecting an image comprises generating edges between (i) each of the nodes in one column of the graphical representation and (ii) each of the nodes in an adjacent column of the graphical representation, wherein each of the generated edges has a corresponding similarity score identifying similarity between features of the images represented by the nodes connected by the edge.

15. The computer program product of claim 12, wherein the selecting an image comprises generating edges between (i) each of the nodes in one column of the graphical representation and (ii) each of the nodes in an adjacent column of the graphical representation, wherein each of the generated edges has a corresponding similarity score identifying similarity between features of the images represented by the nodes connected by the edge.

16. The method of claim 14, wherein the selecting an image comprises identifying a path, from the first column of the graphical representation to the last column of the graphical representation, traversing a node within each column of the graphical representation, wherein the identified path corresponds to the images to be selected for each of the steps.

17. The computer program product of claim 15, wherein the selecting an image comprises identifying a path, from the first column of the graphical representation to the last column of the graphical representation, traversing a node within each column of the graphical representation, wherein the identified path corresponds to the images to be selected for each of the steps, wherein the identifying a path comprises identifying a path having the highest similarity, based upon the similarity scores, between the nodes connected within the path.

18. The method of claim 16, wherein the identifying a path comprises identifying a path having the highest similarity, based upon the similarity scores, between the nodes connected within the path.

* * * * *